J. F. DORNFELD.
CLUTCH.
APPLICATION FILED FEB. 20, 1908.
905,156.
Patented Dec. 1, 1908.
2 SHEETS—SHEET 1.
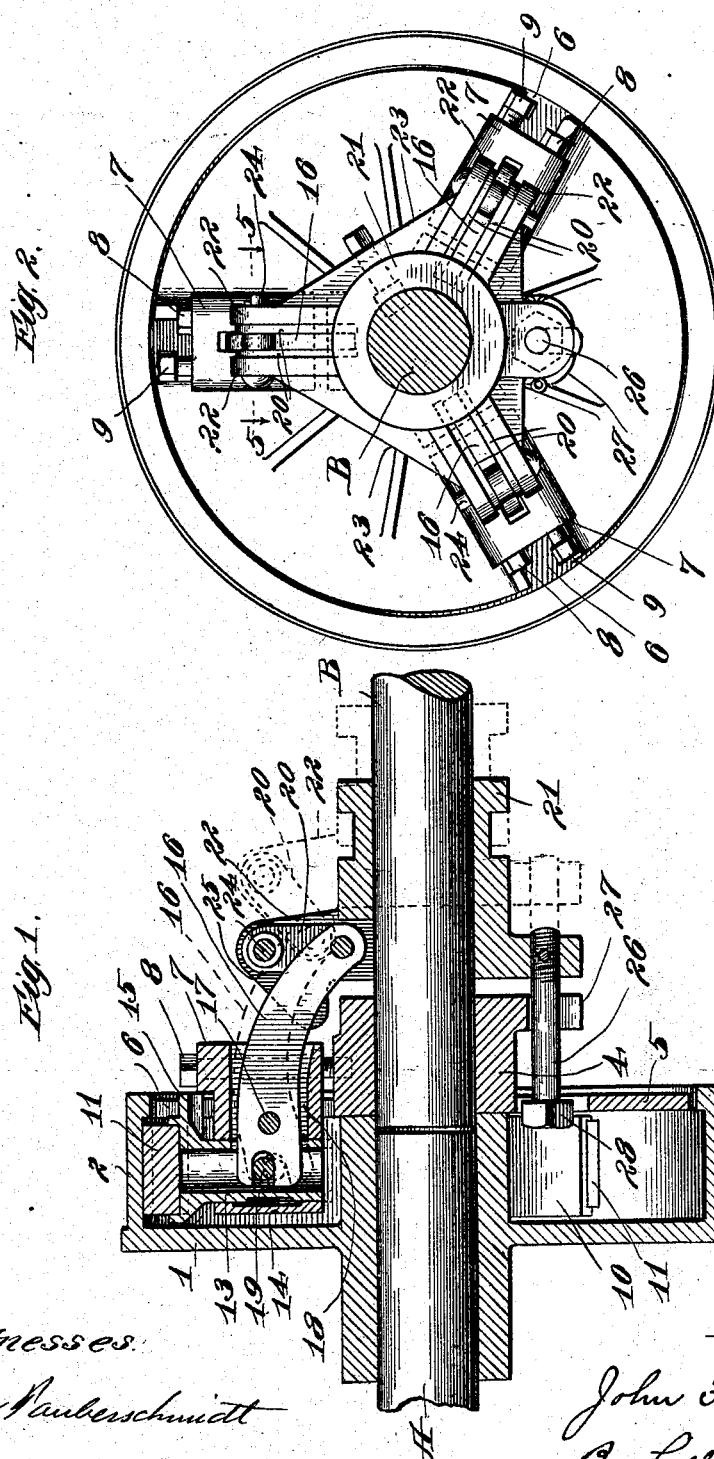
Witnesses:
G. A. Nauberschmidt
George L. Chindahl
Inventor:
John F. Dornfeld
By Luther L. Miller
Atty

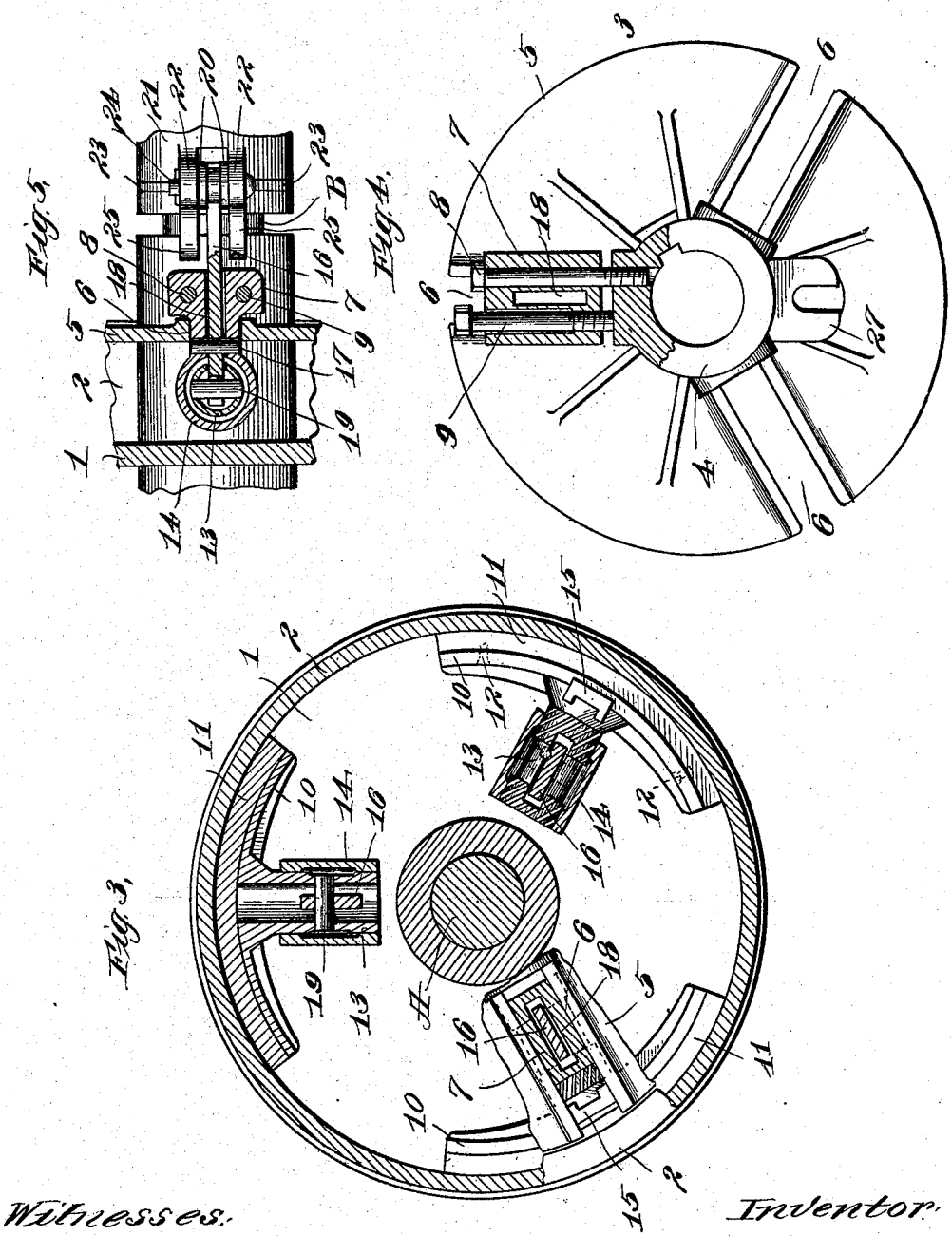

UNITED STATES PATENT OFFICE.

JOHN F. DORNFELD, OF CHICAGO, ILLINOIS.

CLUTCH.

No. 905,156.      Specification of Letters Patent.      Patented Dec. 1, 1908.

Application filed February 20, 1908. Serial No. 416,836.

*To all whom it may concern:*

Be it known that I, JOHN F. DORNFELD, a citizen of the United States, residing at Chicago, in the county of Cook and State of Illinois, have invented certain new and useful Improvements in Clutches, of which the following is a specification.

The object of this invention is to produce a friction clutch embodying the improvements hereinafter set forth.

In the accompanying drawings, Figure 1 is a longitudinal central section through a friction clutch embodying the features of my invention. Fig. 2 is a view of said clutch taken from the right-hand side of Fig. 1. Fig. 3 is a sectional view showing the friction shoes and the means for slidably supporting them. Fig. 4 is a veiw of that portion of the clutch structure which is secured to one of the parts to be connected. Fig. 5 is a section on dotted line 5 5 of Fig. 2.

In the drawings the two shafts, the shaft and gear or pulley, or the other parts to be operatively connected are indicated by the reference letters A and B.

The embodiment selected for illustration comprises a casing 1 secured to the part A, said casing comprising an annular wall 2. Fixed to the part B is a structure 3 (Fig. 4) comprising in this instance a hub 4 mounted upon the part B and a disk 5 which may be cast integral with the hub 4, said disk forming one wall of the casing 1. A plurality of radial guide-ways 6 are formed in the disk 5. Within each of said guide-ways is mounted a block 7 which is adjustably connected to the hub 4 in any suitable way, as, for example, by means of the screw bolts 8 and 9 (Fig. 4). The bolt 8 takes into the hub 4 and is arranged to draw the block 7 toward said hub. The bolt 9, which has a screw-thread engagement with the block 7 and bears against the hub 4, provides means for moving said block away from said hub.

In the present embodiment, the driving connection between the casing 1 and the structure 3 is obtained by means of clutch shoes 10 adapted to frictionally engage the inner side of the annular wall 2. Each shoe has a friction facing 11 of wood or other suitable material, which facing may be secured in place by screws 12. Each shoe is provided with a central tubular supporting-stem 13, which is slidably mounted within a tubular bearing sleeve 14 formed integral with or otherwise suitably secured to the block 7. Upon the shoe 10 is a guide or driving portion 15 (Figs. 1 and 3) slidably mounted in the guide-way 6.

Each shoe 10 is moved radially toward and away from the axis of the parts A and B by means of a lever 16 pivoted upon a pin 17 in the block 7 and extending through a slot 18 in said block. One end of said lever is connected in any suitable manner with the shoe 10, as, for example, by means of a pin 19 in the stem 13 adapted to lie in the bifurcated inner end of the lever. The other end of the lever 16 is connected by means of links 20 with a clutch collar 21 slidably mounted upon the part B. The clutch collar 21 has a plurality of pairs of bearing ears 22 extending radially therefrom, said pairs of ears being connected by the strengthening webs 23. The links 20 are pivoted upon pins 24 in the bearing ears 22. Preferably a lug 25 extends forward from each of the ears 22, said lugs lying at opposite sides of the links 20 and serving to support said links against any strain that may occur during rotation of the clutch.

The clutch collar 21 is arranged to rotate with the structure 3 in any suitable way, as, for instance, by means of a member 26 (which may be a bolt) fixed to said clutch collar and extending freely through a notched lug 27 integral with or otherwise fixed to the hub 4. A stop portion 28 on the member 26 limits the sliding movement of the clutch collar 21 by engaging with the lug 27. The clutch collar 21 is slid longitudinally of the part B by any common or preferred means.

In operation, the parts A and B are operatively connected together by sliding the clutch collar 21 from the position indicated in dotted lines in Fig. 1 to the position indicated in full lines in said figure. Such a movement of the clutch collar 21 rocks the levers 16 upon their pivots 17 to throw the clutch shoes 10 into driving engagement with the annular wall 2 of the casing 1. A movement of the clutch collar 21 in the opposite direction withdraws the shoes 10 from engagement with said annular wall. Wear upon the friction faces 11 may be taken up by moving the blocks 7 radially outward, which adjustment is obtained by slackening the bolt 8 and turning the bolt 9 to force the block away from the hub 4.

As will be seen from an inspection of Fig. 1, when the shoes 10 are in engaging position, the pivot 24 of the links 20 is nearer the pivot 17 of the lever 16 than is the pivotal connection between said lever and said links. Said lever is thus locked against accidental movement tending to withdraw the shoe 10 from engagement with the wall 2. The shoes 10 are driven from the part B (or communicate motion to said part) through the structure 3. It will be noted that the supporting stems 14 for said shoes are carried by the blocks 7, which in turn are mounted in the guide-ways 6 of the disk 5 of said structure.

It will be apparent to those skilled in the art that various mechanical embodiments of the invention are possible, and I therefore do not wish to be limited to the arrangement and construction shown.

I claim as my invention:

1. In a clutch, a member having a guideway and a hub; a block in said guideway and mounted for fixed adjustment with said hub; a clutch member slidably supported by said block; a lever pivoted to said block and connected with said clutch member; means operating said lever; and a member to be engaged by said clutch member.

2. In a clutch, in combination, a member having a guideway therein, and a hub; a block mounted in said guideway and adjustably connected with said hub; a clutch member having a stem slidably supported in said block; a lever pivoted in said block and connected with said stem; means for operating said lever; and a member arranged to be engaged by said clutch member.

3. In a clutch, in combination, a member having a guideway therein, and a hub; a block mounted in said guideway and adjustably connected with said hub; a clutch member slidably supported in said block; a lever pivoted in said block and connected with said clutch member; a slidably mounted collar; a link connection between said collar and said lever; and a member arranged to be engaged by said clutch member.

4. In a clutch, in combination, a member having a guideway therein, and a hub; a block mounted in said guideway and adjustably connected with said hub; a clutch member slidably supported in said block; a lever pivoted in said block and connected with said clutch member; a slidably mounted collar; a link connecting said collar and said lever, said link being arranged to lock said lever against accidental movement when in operative position; and a member arranged to be engaged by said clutch member.

5. In a clutch, in combination, a casing comprising an annular wall; a structure comprising a hub and a disk fixed to said hub, said disk forming one wall of said casing, said disk having a plurality of guideways therein; members mounted in said guideways; clutch members within said casing and supported by the members in said guideways and arranged to engage said annular wall; and means outside of said casing for moving said clutch members into and out of operative position.

6. In a clutch, in combination, a member provided with a hub, said member having a guideway therein; a block mounted in said guideway; a bolt arranged to move said block toward said hub; a bolt arranged to move said block away from said hub; a clutch member carried by said block; a lever pivoted in said block and connected with said clutch member; means for operating said lever; and a member arranged to be engaged by said clutch member.

7. In a clutch, in combination, a casing comprising an annular wall; a structure comprising a hub and a disk fixed to said hub, said disk forming one wall of said casing, said disk having a plurality of radial guideways therein; a block mounted in each of said guideways and adjustably connected with said hub; a friction shoe having a stem slidably supported in each of said blocks; a lever pivoted in each of said blocks and connected at its inner end with the stem of one of said shoes; a clutch collar slidably mounted upon one of said shafts; a link connected between said collar and each of said levers; and means for causing said collar to rotate with said structure.

JOHN F. DORNFELD.

Witnesses:
L. L. MILLER,
GEORGE L. CHINDAHL.